United States Patent [19]
Claps

[11] 3,781,674
[45] Dec. 25, 1973

[54] NOISE DISCRIMINATING CIRCUITRY AND METHOD FOR ELECTRONIC PARTICLE STUDY APPARATUS

[75] Inventor: William A. Claps, Dade, Fla.

[73] Assignee: Coulter Electronics, Inc., Hialeah, Fla.

[22] Filed: July 22, 1971

[21] Appl. No.: 165,276

[52] U.S. Cl. .............................. 324/71 CP, 328/114
[51] Int. Cl. ........................................... G01n 27/08
[58] Field of Search ..................... 324/71 CP, 71 R; 307/234, 231; 328/114, 132, 165

[56] References Cited
UNITED STATES PATENTS

| | | | |
|---|---|---|---|
| 3,259,842 | 7/1966 | Coulter et al. | 324/71 CP |
| 3,502,973 | 3/1970 | Coulter et al. | 324/71 CP |
| 3,517,321 | 6/1970 | Weiss | 328/114 |
| 3,548,206 | 12/1970 | Ogle et al. | 307/231 X |
| 3,701,029 | 10/1972 | Hogg | 324/71 CP |
| 3,271,671 | 9/1966 | Coulter | 324/71 CP |
| 3,617,904 | 11/1971 | Marino | 307/234 |
| 3,599,016 | 8/1971 | Leightner | 307/234 |
| 3,594,726 | 7/1971 | Fleisher | 328/132 |

Primary Examiner—Gerard R. Strecker
Attorney—I. Irving Silverman et al.

[57] ABSTRACT

By discriminating against signal rise time, i.e., the duration of the leading edge of a signal, noise signals can be excluded from data transmisson wherein the data pulses normally have slower rise times, even though both noise and data pulses exceed low threshold settings. When the subject discrimination is employed in the environment of a Coulter particle analyzing apparatus, the minimum rise time of data pulses derived from monitored particles is a known value; therefore, all signals having faster rise time can be discriminated against. The discriminator can comprise a source of clock pulses and a simple binary counter by use of which the rise time of each signal is compared with a preset time or count value. All signals having a rise time greater than the preset value causes the discriminator to enable an output gate which passes the original signal to subsequent processing and analyzing circuits for particle analysis.

17 Claims, 4 Drawing Figures

PATENTED DEC 25 1973 3,781,674

INVENTOR
WILLIAM A. CLAPS

NOISE DISCRIMINATING CIRCUITRY AND METHOD FOR ELECTRONIC PARTICLE STUDY APPARATUS

BACKGROUND OF THE INVENTION

The field of this invention is noise discrimination for electronic particle analyzing apparatus and more particularly is concerned with noise discrimination for apparatus in which studies may be made of particulate systems using the Coulter sensing principle in a manner to obtain more accurate size information than heretofore achieved.

The Coulter sensing principle is disclosed in U.S. Pat. No. 2,656,508 issued Oct. 20, 1953 to Wallace H. Coulter. According to this principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 and improvement U.S. Pat. No. 3,259,842 has been used to count and size particles in biological fluids, industrial powders and slurries, etc., and is sold throughout the world under the trademark COULTER COUNTER.

In commercial versions of the Coulter principle analyzing apparatus, the electric field of small dimensions has been formed commonly by a microscopic passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size and distribution studies, as well as distinguish between different types of particles because of their size differences.

As might be expected, the generation of the particle-produced signals is not free from the generation of noise signals. Since noise signals generally have low amplitudes in comparison to data signals, it has been common to mask out the noise by employing low threshold discrimination. Threshold discrimination has been particularly useful in particle analysis, as taught in the cited U.S. Pat. No. 3,259,842 with respect to size range analysis. Unfortunately, when analyzing particulate systems having a wide range of particle sizes, as in industrial studies, the problem of noise is not easily resolved by a low threshold, since the data pulses of small amplitude often have amplitudes which are of the same or close to the same magnitude as some of the noise signals and noise often is written upon the skirts of particle pulses further to thwart amplitude discrimination. Hence, noise discrimination remains a problem.

Another problem associated with most forms of pulse handling apparatus, and certainly recognized in Coulter particle analyzing apparatus, is that the maximum speed of response can be slower than the rate of the input data. Whenever data pulses are received at a rate faster than the analysis apparatus can operate upon them, either some data is simply lost, or the data as a whole becomes distorted in the analysis apparatus. According to the teachings of U.S. Pat. No. 3,259,842 when a pair of particles pass into the scanning ambit of the Coulter type particle sensor aperture such that the two resulting particle-produced pulses are too close to one another for the second one to be accurately analyzed, circuitry is provided to inhibit the apparatus from responding to the second pulse. Statistics has shown that this "accept first, reject second" mode of operation will provide highly statisfactory size distribution results, given a large enough data sample, and also assuming the accepted pulse is a data pulse and not a noise signal. If the first pulse is noise, noise is analyzed and the data pulse is rejected, an unacceptable situation if it is repeated often enough with respect to the total amount of data pulses, especially those of low amplitude.

Heretofore, the undesirable effects of noise have been minimized by careful circuit design to reduce noise per se, noise suppression circuits, use of low thresholds; whereupon, operational modes such as the above-mentioned "accept first, reject second" have provided highly satisfactory particle analysis. Nevertheless, the ever increasing need for greater accuracy and diversified commercial utilization of Coulter particle analyzing apparatus have led to the conclusion that noise discrimination must be improved.

SUMMARY OF THE INVENTION

It is a primary object of the invention to reduce the effects of noise in the operation of a Coulter particle analyzing apparatus. Such object and others are accomplished by method and circuitry which discriminate against the noise signals by measuring the rise time, i.e., the duration of the leading edge, of each signal which is emitted from the output of the particle detector portion of the analyzer. Another definition of rise time is the time of a wave form from the "valley" between two signals to the next peak. All signals which have a rise time less than a predetermined minimum are rejected and all others are passed on to subsequent stages of the analyzer. The predetermined minimum rise time is a function of the sample suspension and known variables of the scanner or stand portion of the particle analyzer.

DESCRIPTION OF THE PREFERRED EMBODIMENTS

Figure 1:
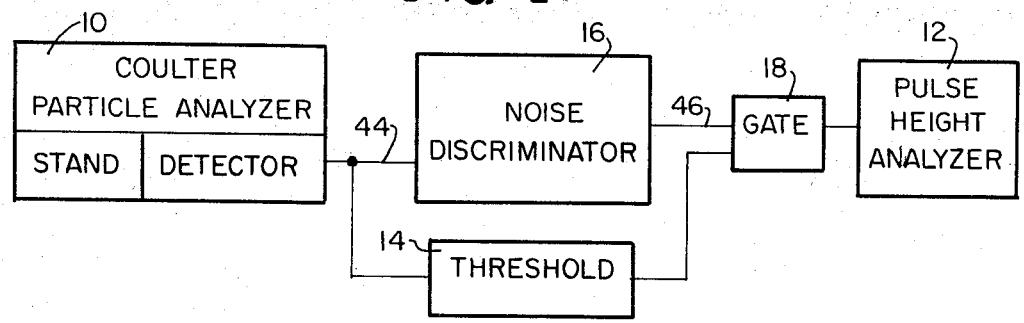
FIG. 1 is a block diagram of a system constructed in accordance with the invention and having a noise discriminator.

A system constructed in accordance with the invention is shown in FIG. 1 and includes the stand and detector portions of a Coulter particle analyzer 10; a pulse height analyzer 12, which typically forms the output portion of a Coulter system; threshold means 14 in series between the detector and pulse height analyzing portions, and for purposes of this discussion can be a simple low threshold circuit; noise discriminating circuitry 16, which is the primary subject of the invention; and a gate 18 leading to the input of the pulse height analyzer. The stand portion typically may include vessels for holding a suspension of the sample particles and for receiving the suspension after it passes through the aperture in one of them, that one commonly being called an aperture tube. Necessary fluid pumping and measuring equipment also is found in the stand. A pair of electrodes is positioned relative to the opposite ends of the aperture, with the change of impedance in the aperture path, due to the presence therein of a particle, causing the electrodes to "sense" the particle. These electrodes form the input to the detector portion, which in a simple example is an amplifier. U.S. Pat. No. 3,259,842 describes the stand and one form of detector portion in more detail.

Figure 2:
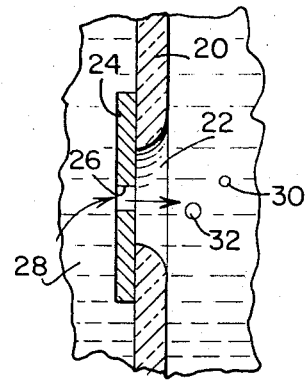
FIG. 2 is a greatly enlarged, fragmentary sectional view, somewhat diagrammatic of the aperture portion of a Coulter particle analyzer.

FIG. 2 herein shows a greatly enlarged cross section of a portion of an aperture tube 20, having an orifice 22 over which there is secured an annular wafer 24 having in its center a microscopic aperture 26, which is the scanning aperture mentioned hereinabove. Illustrated in FIG. 2 is the fact that the suspension of particles 28 is caused to flow through the aperture 26 and that a small particle 30, then a larger particle 32 have just passed therethrough.

Figure 3:
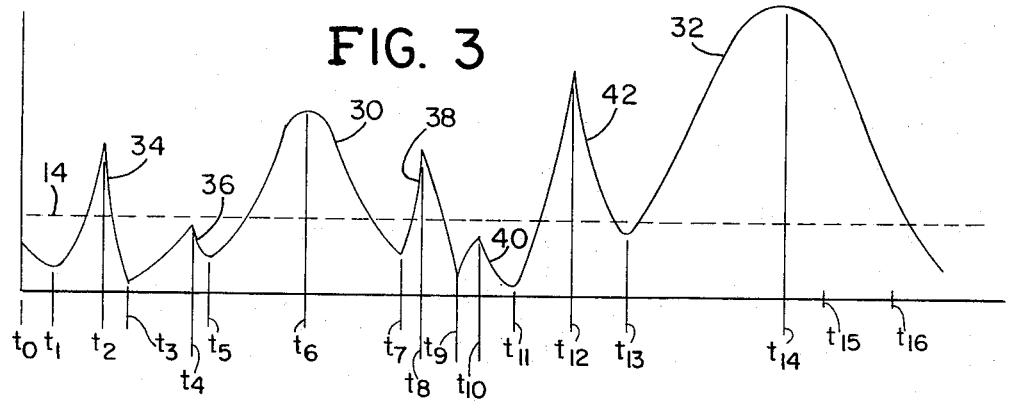
FIG. 3 is a diagram showing the graphs of signals resulting from noise and from particles passing through the aperture.

FIG. 3 shows the resulting particle-produced pulses 30 and 32 with the pulse 32 proportionately larger, since the particle 32 is larger than the particle 30. Also depicted on FIG. 3 is the low threshold level 14 derived from the threshold means 14. A plurality of noise signals 34, 36, 38, 40, and 42 are illustrated. It is these signals that could be counted as particle pulses or could cause the particle pulses 30 and 32 to be rejected by prior art Coulter analyzers and are to be discriminated against according to the method and apparatus of the present invention.

As shown in FIG. 3, the particle-produced pulses 30 and 32 have a generally bell-shaped profile in contrast to the spike shape of typical noise signals. The shape of particle-produced pulses are not always symmetric nor do they always have a simple smooth curvature about their maximum amplitude, in fact, they sometimes are humped like a camel. Nevertheless, observation and experimentation has verified that the leading edge of particle-produced pulses is distinctive from the leading edge of most noise signals. The reasons for such distinctiveness goes somewhat beyond the necessary development of the description of the invention, but broadly can be attributed to the relationship, both physical and electrical, of the passage of a particle through the scanning ambit of the Coulter type aperture.

The size of the aperture, rate of flow of the suspension through the aperture, the impedance of the suspension, and the electric current or field surrounding the aperture path are some of the system parameters which contribute to the shape of the particle pulse. Although these parameters are subject to variation from time to time in any specific apparatuses, and different apparatus can and do have different sizes of apertures, the basic pulse form remains substantially as that illustrated, having a leading edge which has a slower rise time than most noise signals. "Rise time" as herein employed is to be understood to mean the time duration from minimum signal amplitude to maximum amplitude during a uni-directional excursion; a "valley to peak" measurement. With reference to the noise signals 34 to 42, their rise times are labeled on FIG. 3 as: $t1$ to $t2$; $t3$ to $t4$; $t7$ to $t8$; $t9$ to $t10$; and $t11$ to $t12$, respectively. Likewise, the rise times for the particle pulses 30 and 32 are $t5$ to $t6$ and $t13$ to $t14$.

Quite clearly, the rise time durations of the particle pulses are significantly longer than the rise times of the noise signals and thereby can form the basis of noise discrimination, and that is the function of the noise discriminator 16. Since pulse-shape analysis and measurement, leading edge triggers, integrators, analog and digital converters and comparators are but a few common tools to those skilled in the art, the noise discriminator 16 could employ many different combinations of elements. The common denominator of uch discriminators would be the measurement of the rise time of a signal and the comparison of that rise time against a standard of acceptability, such standard being the minimum rise time of a particle pulse. Each signal that had a rise time exceeding the standard would be assumed to be a particle pulse and would pass from the discriminator to the pulse height analyzer 12 (except as subsequently to be noted), all other signals would be rejected.

For purposes of discussion, let it be assumed that the standard of acceptability is 4 microseconds, with that duration being shown on FIG. 3 lying between $t15$ and $t16$. It can be seen relatively easily that the rise times of the particle pulses 30 and 32 amply exceed the standard and that the rise times for all of the noise signals are less than the standard, with the possible exception of the signal 36 and its rise time $t3$ to $t4$, which shall be considered to be greater than 4 microseconds.

According to the method of the invention, the noise discriminator will reject each of the noise signals 34, 38, 40, and 42, received at its input terminal 44, and will accept the signal 36 and the pulses 30 and 32. If it was not for the existence of the threshold means 14 and the gate 18, the signal 36 and the pulses 30 and 32 would pass from the output terminal 46 of the discriminator and be received by the pulse height analyzer 12. By including the threshold means 14 and the gate 18, only those pulses and signals having an amplitude greater than the threshold level 14 will enable the gate 18 to pass an output from the discriminator 16 to the pulse height analyzer 12. Accordingly, the signals 36 and 40, being below the threshold level 14, inhibit the gate 18; hence, the signal 36 passed from the discriminator is blocked from being received by the analyzing portion 12. Thus, only the particle-produced pulses 30 and 32 are received for height analyzing and all of the noise signals have been rejected.

It will be appreciated that the above example is somewhat idealistic and that in fact some noise signals can be generated which both exceed a low threshold level and have a rise time greater than the discriminator's rejection standard. Nevertheless, a great portion of the noise signals will be rejected by the method and circuitry of the invention. Moreover, experimental tests have shown that of the noise signals which are not rejected by the invention, a significant amount now can be identified by other criteria and means and thereby the entire particle analysis process is greatly improved.

Figure 4:
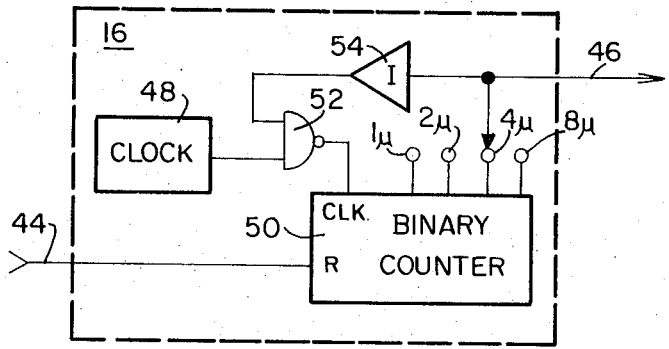
FIG. 4 is a schematic diagram of one embodiment of the noise discriminator.

With reference to FIG. 4, illustrated is but one of many possible forms of the noise discriminator 16. The illustrated embodiment is not necessarily the simplest and certainly not the most complex, but offers a reliable device, which can easily be installed into Coulter particle analyzers, and is especially easy and inexpensive to retrofit into analyzers having some form of a clock pulse generator.

In addition to some form of a clock 48, the only other major component is a multifunction circuit means in the form of a counting element 50. A simple 4-bit binary counting chip will provide more than the required counting and comparing requirements and has the flexibility of providing several different count value outputs; whereby, the same subcombination can be employed in different particle analyzers and furnish different time discrimination standards. A NAND gate 52 and an inverter 54 complete the discriminator.

A 4-bit chip essentially comprises four cascaded flip-flops having a common reset input "R," a clock pulse input "CLK" feeding in the first of the flip-flops, and each flip-flop providing at its output terminal a related binary count output, which for purposes of this example, will be identified as 1, 2, 4, and 8 microsecond outputs.

As shown in FIG. 4, the reset input "R" of the counter 50 forms the input to the discriminator and receives from the input terminal 44 and the detector of the particle analyzer 10 all of the signals and pulses, such as shown in FIG. 3.

Depending upon polarity conditions, it may be necessary to insert inverter (not shown) so that the reset input sees its inputs of a reverse polarity than that transmitted from the Coulter detector. When connected as intended, according to the invention, the trailing edge of each pulse and signal applies a reset action to the entire discriminator 16, so that the counter 50 is ready to measure the duration of each leading edge or rise time. As long as the reset energization (trailing edge) is present, the counter is inhibited from responding to clock pulses which might be received at its "CLK" input and thereby also is prevented from generating an output at its 4 microsecond output "4μ" and the output terminal 46. Such "absence" of output inhibits the gate 18.

The operation of the noise discriminator 16 of FIG. 4 next will be described with reference to the wave forms in FIG. 3. During the time $t0$ to $t1$ reset action is present. From $t1$ to $t2$ the counter is enabled to receive clock pulses and the gate 52 also is enabled to pass the clock pulses, since there is no signal being applied to the inverter from the "4μ" output terminal. Since the duration of $t1$ to $t2$ is less than four microseconds, that rise time will terminate before the clock pulses drive the counter up to the "4μ" output condition. Accordingly, when the peak at $t2$ is reached and the signal 34 commences toward the valley at $t3$, the reset action again is applied to clear the counter. Up to this point there has been no data output from the discriminator.

During the rise time $t3$ to $t4$ of the signal 36, the clock pulses again feed into the counter and, since this duration is greater than four microseconds, there will be an output at the "4μ" terminal and a corresponding input to the gate 18 from the terminal 46. As soon as the "4μ" terminal signal is generated, the inverter 54 feeds an inhibit control to the NAND gate 52, thereby to prevent any further counting operation. Since the signal 36 is blocked by the threshold means 14, as earlier described, the "4μ" output can not pass through the gate 18.

The trailing edge of the signal 36 causes the reset action from $t4$ to $t5$ and, at $t4$, the "4μ" output is terminated so that the gate 52 again is enabled. The particle pulse 30 having a rise time greater than four microseconds from $t5$ to $t6$ causes a logically true response from the discriminator in the same way as the noise signal 36; however, since the threshold 14 has been crossed by the pulse 30, the resulting data output to the gate 18 is passed to the pulse height analyzer 12. The rejection operation upon signals 38, 40, and 42, as well as the acceptance of the pulse 32 now should be obvious.

It is believed that the foregoing has adequately disclosed the inventive method and circuitry so that those skilled in the art would be able to practice same and where necessary evolve modifications to suit specific needs and structural environment without departing from the spirit and scope of the invention.

What is desired to be secured by letters patent of the United States is:

1. A noise signal discriminating method for use in the electronic analysis of particles in which a particle-produced pulse is derived from each particle, comprising the steps of: defining as a standard the minimum acceptable rise time for particle-produced pulses, monitoring the rise time of all noise signals and particle pulses, comparing the monitored rise times against said standard, rejecting all monitored signals and pulses having a rise time shorter than said standard, and accepting all monitored signals and pulses having rise times greater than said standard.

2. A method according to claim 1 in which said defining of said standard is primarily dependent upon parameters established by the method and apparatus of the particle analysis.

3. A method according to claim 2 in which the particle analysis is in accordance with the operation of Coulter particle analysis.

4. A method according to claim 1 in which said comparing is accomplished in a digital mode.

5. A method according to claim 4 in which said digital mode is accomplished by use of a binary counting of the monitored rise time durations.

6. Noise signal discriminating circuitry for use with electronic particle analysis apparatus in which a particle-produced pulse is derived for each particle, said circuitry comprising: circuit means for defining as a standard the minimum acceptable rise time for particle-produced pulses, circuit means for monitoring the rise time of noise signals and particle pulses applied thereto, circuit means for comparing the monitored rise times against said standard, circuit means for rejecting all monitored and compared signals and pulses having a rise time shorter than said standard, and circuit means for accepting all monitored and compared signals and pulses having a rise time greater than said standard.

7. Circuitry according to claim 6 in which each of said defining, monitoring, comparing, rejecting, and accepting circuit means includes and primarily comprises a common circuit element.

8. Circuitry according to claim 7 in which said circuit element is a counter.

9. Circuitry according to claim 8 in which said counter is designed to respond to each said monitored rise time when it exceeds a digitalized measurement of said standard.

10. Circuitry according to claim 9 which includes a source of clock pulses for providing to said counter a time base whereby the digitalized measurement is also a time measurement.

11. Circuitry according to claim 10 in which gating means is interposed between a clock pulse input to said counter and said source of clock pulses, and said gating means also is connected to respond to the acceptance of any compared signal or pulse by said counter to thereby inhibit passage of clock pulses to said counter for the remainder of the rise time for that signal or pulse.

12. Circuitry according to claim 8 in which said counter has a reset input which receives each said pulse and signal for purposes of resetting said counter subsequent to each rise time.

13. Circuitry according to claim 6 in which pulse height analyzing means is coupled to the output of said accepting circuit means.

14. Circuitry according to claim 6 and in combination therewith an electronic particle analysis apparatus for generating the particle-produced pulses, and means for supplying said pulses to said circuitry.

15. The combination according to claim 14 in which said apparatus is in the form of a Coulter particle analyzer and in which the detector portion thereof is connected to said circuitry.

16. The combination according to claim 14 in which a coincidence gate is connected to the output of said circuitry and low threshold means is coupled in parallel with said circuitry, and has a control input to said coincidence gate.

17. The combination according to claim 16 in which pulse height analyzing means is coupled to the output of said coincidence gate.

* * * * *